(12) United States Patent
Xu et al.

(10) Patent No.: US 12,686,250 B2
(45) Date of Patent: Jul. 21, 2026

(54) THERMAL MANAGEMENT INTEGRATED MODULE

(71) Applicant: ZHEJIANG SANHUA INTELLIGENT CONTROLS CO., LTD., Shaoxing City (CN)

(72) Inventors: Yungen Xu, Shaoxing City (CN); Tao Weng, Shaoxing City (CN); Yunfang Zhang, Shaoxing City (CN); Yongxiang Tan, Shaoxing City (CN)

(73) Assignee: ZHEJIANG SANHUA INTELLIGENT CONTROLS CO., LTD., Shaoxing City (CN)

( * ) Notice: Subject to any disclaimer, the term of this patent is extended or adjusted under 35 U.S.C. 154(b) by 228 days.

(21) Appl. No.: 18/431,966

(22) Filed: Feb. 3, 2024

(65) Prior Publication Data

US 2024/0262252 A1    Aug. 8, 2024

(30) Foreign Application Priority Data

Feb. 3, 2023    (CN) .......................... 202310129262.7

(51) Int. Cl.
| | |
|---|---|
| *B60H 1/32* | (2006.01) |
| *B60H 1/00* | (2006.01) |
| *B60L 58/26* | (2019.01) |
| *F25B 41/20* | (2021.01) |
| *H01M 10/625* | (2014.01) |

(52) U.S. Cl.
CPC ....... *B60H 1/3223* (2013.01); *B60H 1/00485* (2013.01); *B60H 1/00521* (2013.01); *B60H 1/00542* (2013.01); *B60H 1/3229* (2013.01); *B60H 1/323* (2013.01); *B60L 58/26* (2019.02);

*F25B 41/20* (2021.01); *H01M 10/625* (2015.04); *F25B 2400/071* (2013.01); *F25B 2500/13* (2013.01)

(58) Field of Classification Search
CPC .......................... B60H 1/3223; B60H 1/3229
See application file for complete search history.

(56) References Cited

U.S. PATENT DOCUMENTS

| | | | | |
|---|---|---|---|---|
| 4,012,020 A | * | 3/1977 | Dixon .................. | B60H 1/3223 |
| | | | | 474/113 |
| 4,988,071 A | | 1/1991 | Shimazaki et al. | |

(Continued)

FOREIGN PATENT DOCUMENTS

| | | |
|---|---|---|
| CN | 106183763 A | 12/2016 |
| CN | 205768506 U | 12/2016 |

(Continued)

*Primary Examiner* — Christopher R Zerphey
(74) *Attorney, Agent, or Firm* — Cheng-Ju Chiang

(57)    ABSTRACT

A thermal management integrated module includes a compressor, a first flow channel plate and a compressor bracket. The first flow channel plate includes a body portion and a connecting portion. At least one flow channel is provided in the body portion. The body portion and the connecting portion are of a one-piece configuration. The compressor bracket includes a first mounting portion and a second mounting portion. The first mounting portion and the second mounting portion have different orientations. The compressor is connected to the first mounting portion. The connecting portion is connected to the second mounting portion.

19 Claims, 11 Drawing Sheets

(56) References Cited

U.S. PATENT DOCUMENTS

| | | | | |
|---|---|---|---|---|
| 6,438,985 | B1 * | 8/2002 | Hayashi | F24F 1/0003 |
| | | | | 62/298 |
| 9,518,590 | B2 * | 12/2016 | Arai | B60H 1/00521 |
| 10,589,598 | B2 * | 3/2020 | Connell | B60H 1/3229 |
| 11,078,985 | B2 * | 8/2021 | Kim | F16F 1/3849 |
| 11,192,425 | B2 * | 12/2021 | Oh | B60H 1/00007 |
| 11,440,376 | B2 * | 9/2022 | Calderone | B60K 7/0007 |
| 12,292,241 | B2 * | 5/2025 | Hu | F28F 9/0253 |
| 2024/0181846 | A1 * | 6/2024 | Lee | B60H 1/3227 |
| 2024/0190216 | A1 * | 6/2024 | Mieda | B60H 1/3223 |
| 2024/0416722 | A1 * | 12/2024 | Kim | B60H 1/00899 |
| 2024/0416727 | A1 * | 12/2024 | Kim | B60H 1/3223 |
| 2025/0010685 | A1 * | 1/2025 | Kwak | B60H 1/32 |
| 2025/0042225 | A1 * | 2/2025 | Sugiyama | B60H 1/3229 |
| 2025/0058605 | A1 * | 2/2025 | Woo | B60H 1/32281 |

FOREIGN PATENT DOCUMENTS

| | | | |
|---|---|---|---|
| CN | 206826352 | U | 1/2018 |
| CN | 114407612 | A | 4/2022 |
| CN | 114670602 | A | 6/2022 |
| DE | 102020109006 | A1 | 10/2021 |
| EP | 1354735 | A1 | 10/2003 |
| JP | S57-61252 | U | 4/1982 |
| JP | 2014-35176 | A | 2/2014 |
| JP | 2014-218211 | A | 11/2014 |
| WO | 2021/048095 | A1 | 3/2021 |
| WO | 2021/197964 | A1 | 10/2021 |
| WO | 2022253097 | A1 | 12/2022 |

* cited by examiner

A-A

15

THERMAL MANAGEMENT INTEGRATED MODULE

CROSS-REFERENCE TO RELATED APPLICATION

This patent application claims priority of a Chinese Patent Application No. 202310129262.7, filed on Feb. 3, 2023 and titled "THERMAL MANAGEMENT INTEGRATED MODULE", the entire content of which is incorporated herein by reference.

TECHNICAL FIELD

The present disclosure relates to a thermal management integrated module, and in particular to an integrated structure of a compressor and a heat pump module of a thermal management integrated module.

BACKGROUND

A thermal management integrated module of the related technology includes a connecting member, a bracket, a compressor and a flow channel plate. The flow channel plate is bolted to one end of the connecting member for positioning. The compressor is disposed horizontally on the bracket. The bracket is connected and fixed to another end of the connecting member. The compressor and the connecting member are mounted on a same mounting surface of the bracket. As a result, the entire integrated module is large and not compact.

SUMMARY

An object of the present disclosure is to provide a thermal management integrated module with small profile.

In order to achieve the above object, the present disclosure adopts the following technical solution: a thermal management integrated module, including: a compressor; a first flow channel plate; the first flow channel plate including a body portion and a connecting portion; the body portion defining at least one flow channel; the body portion and the connecting portion being of a one-piece configuration; and a compressor bracket; the compressor bracket including a first mounting portion and a second mounting portion; the first mounting portion and the second mounting portion having different orientations; the compressor being connected to the first mounting portion; and the connecting portion being connected to the second mounting portion.

The first mounting portion and the second mounting portion of the present disclosure have different orientations, the compressor is connected to the first mounting portion, and the connecting portion is connected to the second mounting portion. That is, the compressor and the flow channel plate are respectively mounted in a staggered manner on the first mounting portion and the second mounting portion having different orientations, a space of the thermal management integrated module can be fully utilized, so that the thermal management integrated module is smaller in size.

Figure 1:
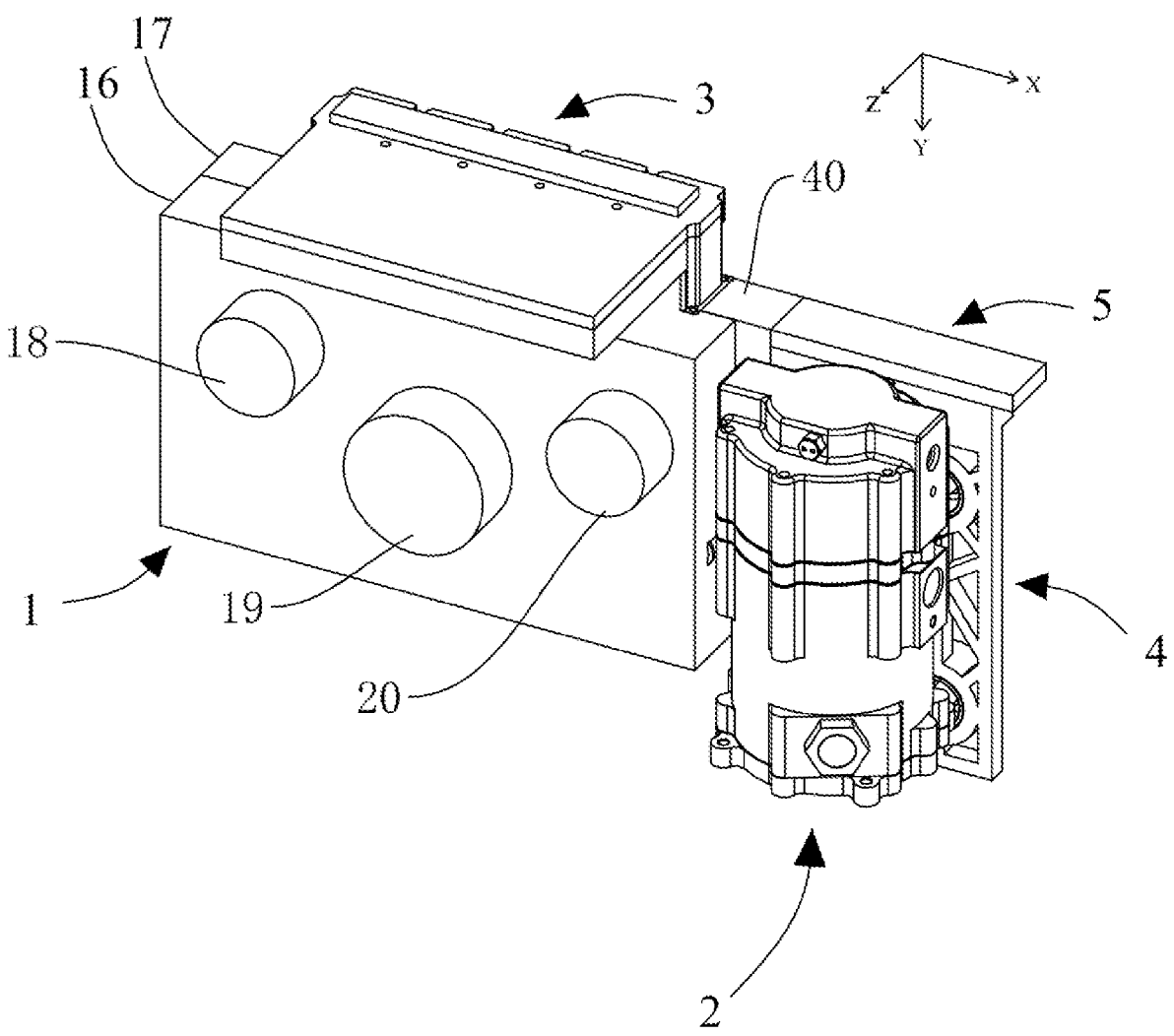
FIG. 1 is a perspective view of a thermal management integrated module in accordance with an embodiment of the present disclosure.

REFERENCE SIGNS body portion 1; compressor 2; integrated controller 3; compressor bracket 4; connecting portion 5; inner ring 6; vibration reduction seat 7; outer ring 8; through hole 9; groove 10; through hole 11; corner portion 12; reinforcing block 13; protruding block 14; vibration reduction assembly 15; second flow channel plate 16; first flow channel plate 17; battery cooling water pump 18; multi-way water valve 19; motor cooling water pump 20; battery cooler 21; boss 22; corner mounting area 23; ridge 24; second valve port 25; first valve port 26; mounting hole 27; first wall 28; first side wall 29; first surface 30; hollow portion 31; inner threaded hole 32; first mounting portion 33; second mounting portion 34; flow channel 35; transverse portion 36; transverse side 37; longitudinal side 38; contact surface 39; top surface 40; matching hole 41.

DETAILED DESCRIPTION

The following description is provided to enable those skilled in the art to practice the present disclosure. The preferred embodiments in the following description are only examples, and other obvious modifications may be come up with by those skilled in the art. The basic principles of the present disclosure defined in the following description may be applied to other embodiments, variations, improvements, equivalents, and other technical solutions without departing from the spirit and scope of the present disclosure. All technical solutions and improvements thereof that do not depart from the spirit and scope of the present disclosure shall be covered by the claims of the present disclosure.

It is understandable to those skilled in the art that in the present disclosure, the orientation or positional relationship indicated by the terms of "longitudinal", "lateral", "upper", "lower", "front", "rear", "vertical", "horizontal", "top", "bottom", "inner", "outer", etc., is based on the orientation or positional relationship shown in the drawings, which is only for the convenience of describing the present disclosure and simplifying the description, but does not indicate or imply that the device or element referred to must have a specific orientation, be constructed and operated in a specific orientation, and therefore the above terms should not be construed as limitations to the present disclosure.

It is understandable that the term "a" or "an" should be understood as "at least one" or "one or more". That is, in one embodiment, the number of an element may be one, but in other embodiments, the number of the element may be more than one. Therefore, the term "a" or "an" is not to be understood as a limitation on quantity.

A thermal management integrated module is generally used in a vehicle thermal management system. That is, some of the separately mounted components in the vehicle thermal management system are integrated to form an integrated module. The thermal management integrated module coordinates cooling and heat to meet the cooling and heat needs of the vehicle, such as the cooling needs of the motor, the cooling needs of the power battery, and conditional control of refrigerant flow, etc.

The present disclosure will be described below with reference to all or part of FIG. 1 to FIG. 12. Directions of the present disclosure are based on FIG. 1, that is, a length direction of a body portion 1 is the X direction, a height direction of the body portion 1 is the Y direction, and a thickness direction of the body portion 1 is the Z direction.

Referring mainly to FIG. 1 to FIG. 5, the present disclosure provides a thermal management integrated module, which includes a compressor 2, a compressor bracket 4, a first flow channel plate 17 and a second flow channel plate 16. The first flow channel plate 17 includes the body portion 1 and a connecting portion 5. At least one flow channel 35 is defined in the body portion 1. The body portion 1 and the connecting portion 5 are of a one-piece configuration. The compressor bracket 4 includes a first mounting portion 33 and a second mounting portion 34. The first mounting portion 33 and the second mounting portion 34 have different orientations. The compressor 2 is connected to the first mounting portion 33. The connecting portion 5 is connected to the second mounting portion 34. In the illustrated embodiment, the compressor 2 is a centrifugal compressor (for example, a scroll compressor). In an optional embodiment, the compressor 2 may also be an axial flow compressor or the like. In the illustrated embodiment of the present disclosure, the thermal management integrated module is used in new energy vehicle systems, but is not limited to the new energy vehicle systems. The thermal management integrated module is connected and fixed to a suspension of the vehicle. The thermal management integrated module has obvious advantages, namely, high degree of integration and easy mounting. In addition, for the present disclosure itself, mounting the compressor 2 and the connecting portion 5 to the first mounting portion 33 and the second mounting portion 34 that have different orientations can make the product compact in layout and small in size, thereby freeing up the space of the vehicle body. In the present disclosure, the first mounting portion 33 and the second mounting portion 34 are in an adjacent connection relationship, and are perpendicular to each other. The compressor bracket 4 and the connecting portion 5 may be rigidly connected, for example, by using bolts or rivets or buckles. The compressor bracket 4 and the connecting portion 5 can also be floatingly connected, for example, using buffer pads, vibration-absorbing pads, etc. Similarly, the compressor 2 and the compressor bracket 4 may be rigidly connected or floatingly connected. In the present disclosure, the compressor bracket 4 and the connecting portion 5 are connected and fixed by bolts. The compressor 2 and the compressor bracket 4 are fixed by floating connection. Besides, in the present disclosure, the connection method between the compressor bracket 4 and the body portion 1 includes direct connection or indirect connection. The body portion 1 and the connecting portion 5 are of a one-piece configuration, which can be understood as the connecting portion 5 itself is a part of the body portion 1. Then, the compressor bracket 4 is directly connected to the body portion 1. It can also be understood that the connecting portion 5 itself is not a part of the body portion 1, but the connecting portion 5 is extended along the length direction of the body portion 1. The body portion 1 and the connecting portion 5 are integrally formed by injection and stamping, or the body portion 1 and the connecting portion 5 are integrally formed by welding. Then, the compressor bracket 4 and the body portion 1 are indirectly connected.

Further, as shown in FIG. 1 to FIG. 5, the first flow channel plate 17 is a refrigerant flow channel plate, and the second flow channel plate 16 is a coolant flow channel plate. The refrigerant flow channel plate is used for the circulation of refrigerant to connect different components of the refrigerant system. A plurality of refrigerant flow circuits are formed in the refrigerant flow channel plate. When there are communication relationships between different components that require refrigeration, which will be described in detail below, the communication between two of the different components can be achieved through the refrigerant flow circuit formed at a corresponding position of the refrigerant flow channel plate. The coolant flow channel plate is used for coolant circulation to connect different components of the coolant circuit. Similarly, a plurality of coolant flow circuits are formed in the coolant flow channel plate. When there are communication relationships between different components that require coolant, the communication can be achieved through a coolant circulation circuit formed at a corresponding position of the coolant flow channel plate. It can be understood that the circuits inside the refrigerant flow channel plate and the coolant flow channel plate, the type and number of thermal management components, and the mounting positions of different components mounted to the refrigerant flow channel plate and the coolant flow channel plate can be adjusted accordingly according to actual needs to achieve actual vehicle-wide thermal management.

Figure 2:
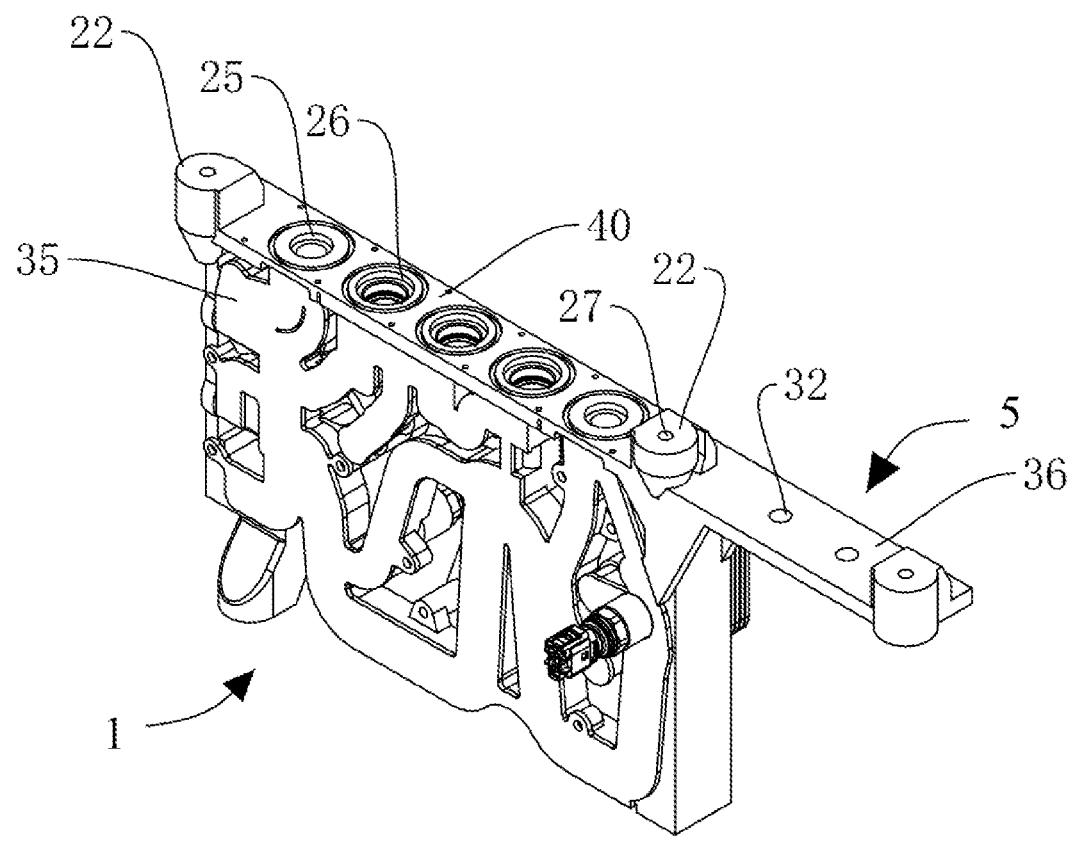
FIG. 2 is a perspective view of a refrigerant flow channel plate shown in FIG. 1.
Figure 3:
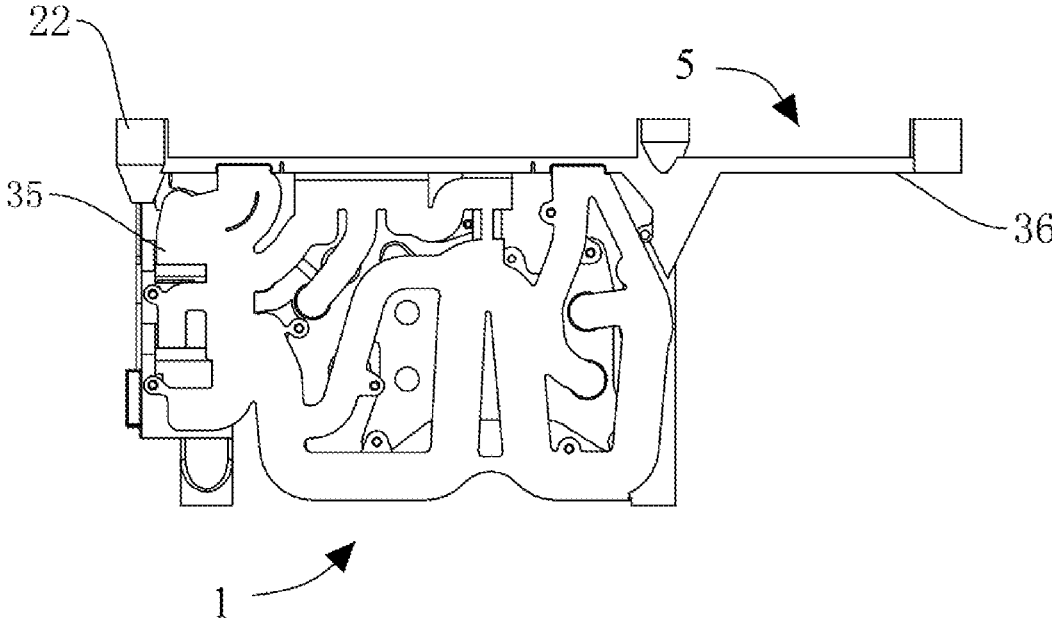
FIG. 3 is a front view of the refrigerant flow channel plate shown in FIG. 2.
Figure 4:
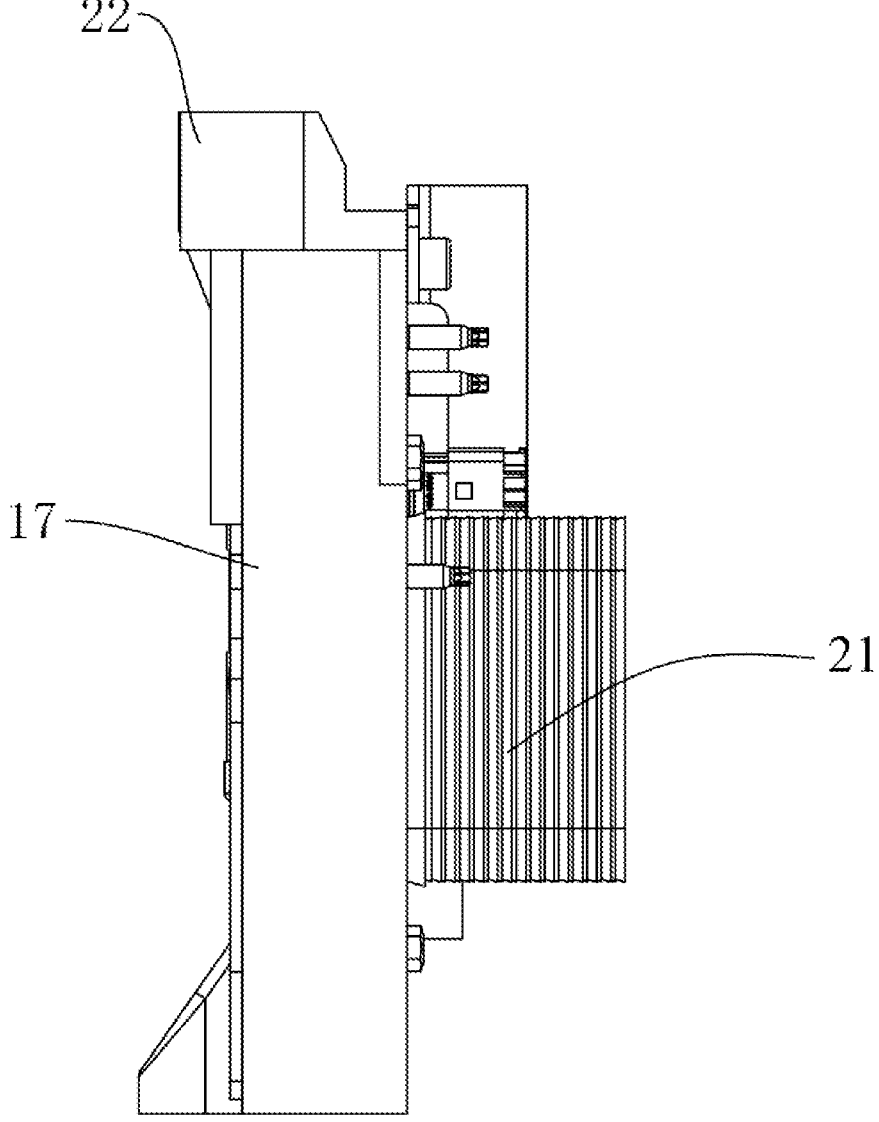
FIG. 4 is a side view of the refrigerant flow channel plate shown in the FIG. 3.

The first flow channel plate 17 and the second flow channel plate 16 are disposed in an overlapping manner, and connected and fixed. That is, the refrigerant flow channel plate includes a third mounting surface facing the coolant flow channel plate; the coolant flow channel plate includes a fourth mounting surface facing the refrigerant flow channel plate; and the third mounting surface and the fourth mounting surface are connected and fixed by bolts. There may be a certain gap between the third mounting surface of the refrigerant flow channel plate and the fourth mounting surface of the coolant flow channel plate, or they may be in close contact with each other. In the embodiment of the present disclosure, the first flow channel plate 17 and the second flow channel plate 16 are made of different materials. The first flow channel plate 17 (the refrigerant flow channel plate) is at least partially made of metal. All metal materials, such as aluminum, aluminum alloy materials, etc., may be used in the present disclosure. This material selection can avoid refrigerant leakage and reduce its own weight, while also ensuring the strength of the refrigerant flow channel, thereby improving the structural stability and durability of the first flow channel plate 17 as one of the main bodies of the thermal management integrated module. The second flow channel plate 16 (the coolant flow channel plate) is at least partially made of plastic material. All plastic materials, such as polypropylene (abbreviated as PP) and other thermal insulation materials may be used in the present disclosure. The reason why this material is used can not only ensure the thermal insulation performance of the coolant flow channel plate, but also ensure the strength of the coolant flow channel plate, thereby improving the structural stability and strength of the coolant flow channel plate as another main body of the thermal management integrated module. In an optional embodiment, the coolant flow channel plate can also be made of metal. However, considering the cost, weight and practical utility, the coolant flow channel plate is generally not made of metal. Secondly, in an optional embodiment, the connecting portion 5 may also be provided on a bottom side of the body portion 1. However, considering the mounting of the compressor bracket 4, the mounting of the compressor 2 and the actual mounting of the thermal management integrated module into the vehicle, the former solution is preferred in the present disclosure. As shown in FIG. 2 and FIG. 3, in the illustrated embodiment, the connecting portion 5 includes a first surface 30 facing away from the compressor bracket 4. The first surface 30 is flush with a top surface 40 of the refrigerant flow channel plate. In the actual production process, the first surface 30 of the connecting portion 5 and the top surface 40 of the refrigerant flow channel plate are not necessarily completely flush, and a certain deviation can be allowed. In an optional embodiment, the first surface 30 of the connecting portion 5 and the top surface of the refrigerant flow channel plate form a stepped configuration. A plurality of bosses 22 are respectively provided on the top and first surface 30 of the refrigerant flow channel plate. Each boss 22 has a mounting hole 27. Therefore, the advantage of having the surface of the connecting portion 5 flush with the top surface of the refrigerant flow channel plate is that the height of each boss 22 remains constant during design, which facilitates connection and fixation of the thermal management integrated module to the suspension of the vehicle, prevents uneven mounting of the thermal management integrated module, and enhances the connection stability between the thermal management integrated module and the suspension of the vehicle. However, according to actual installation, the boss 22 and the mounting hole 27 of different heights can also be implemented. Besides, in the present disclosure, the boss 22 is integrated with the refrigerant flow channel plate and the connecting portion 5, so an operator can mount the thermal management integrated module from a through hole 9 of the suspension into the mounting hole 27 of the boss 22 by bolts.

The thermal management integrated module further includes a battery cooling water pump 18, a multi-way valve, a motor cooling water pump 20, a refrigerant throttling valve, a refrigerant switching valve, an integrated controller 3 and a battery cooler 21. The integrated controller 3 is disposed on the top surface 40 of the refrigerant flow channel plate. The top of the refrigerant flow channel plate has a plurality of first valve ports 26 for mounting refrigerant throttling valves and a plurality of second valve ports 25 for mounting refrigerant switching valves. The first valve ports 26 and the second valve ports 25 are arranged in a line. The battery cooler 21, the refrigerant throttling valve and the refrigerant switching valve are all mounted to the refrigerant flow channel plate. The battery cooling water pump 18, the motor cooling water pump 20, and a multi-way water valve 19 are all mounted to the coolant flow channel plate. The battery cooling water pump 18, the motor cooling water pump 20, the multi-way water valve 19, the refrigerant throttling valves, the refrigerant switching valves and the battery cooler 21 are all electrically connected to the integrated controller 3. Besides, the above-mentioned battery cooling water pump 18, the motor cooling water pump 20, the refrigerant throttling valves, the refrigerant switching valves, etc., are all executing elements, and their driving elements are integrated in the integrated controller 3, and are uniformly driven and controlled by the integrated controller 3. That is, the integrated controller 3 can drive and control the compressor 2, the refrigerant valve, the water pump, and the water valve. Furthermore, the integrated controller 3 can drive and control a heater, and achieve the signal acquisition function of a pressure temperature sensor and a water temperature sensor.

As shown in FIG. 1, FIG. 2, FIG. 3 and FIG. 5, in the illustrated embodiment, the connecting portion 5 includes a transverse portion 36. The mounting direction of the transverse portion 36 extends along the length direction of the body portion 1 (that is, the X direction). The body portion 1 includes a first side wall 29 (for example, a side wall in the Y direction) facing the transverse portion 36. The transverse portion 36 and the first side wall 29 form a corner mounting area 23. The compressor bracket 4 is located at least partially in the corner mounting area 23. The advantage of this solution is that the corner mounting area 23 enables the compressor bracket 4 to be connected to the body portion 1 more stably. In actual use, the compressor 2 will produce a certain intensity of vibration, and since the compressor 2 is connected to the compressor bracket 4, the vibration of the compressor 2 will inevitably cause the compressor bracket 4 to shake. The shaking of the compressor bracket 4 will affect the connection between the connecting portion 5 and the compressor bracket 4, and the connection between the connecting portion 5 and the body portion 1. The arrangement of the corner mounting area 23 can enhance the connection stability between the compressor bracket 4 and the first flow channel plate 17. In an optional embodiment, the first side wall 29 extends along the longitudinal portion along its own height direction (the Y direction). The function of the longitudinal portion is the same as that of the transverse portion 36, but the mounting directions are different. A side edge of the compressor bracket 4 is connected to the longitudinal portion. However, compared with the corner mounting area 23, this solution has the advantages of simple cost and simple design, but the connection stability between the compressor bracket 4 and the longitudinal portion is not as high as the former solution.

Figure 5:
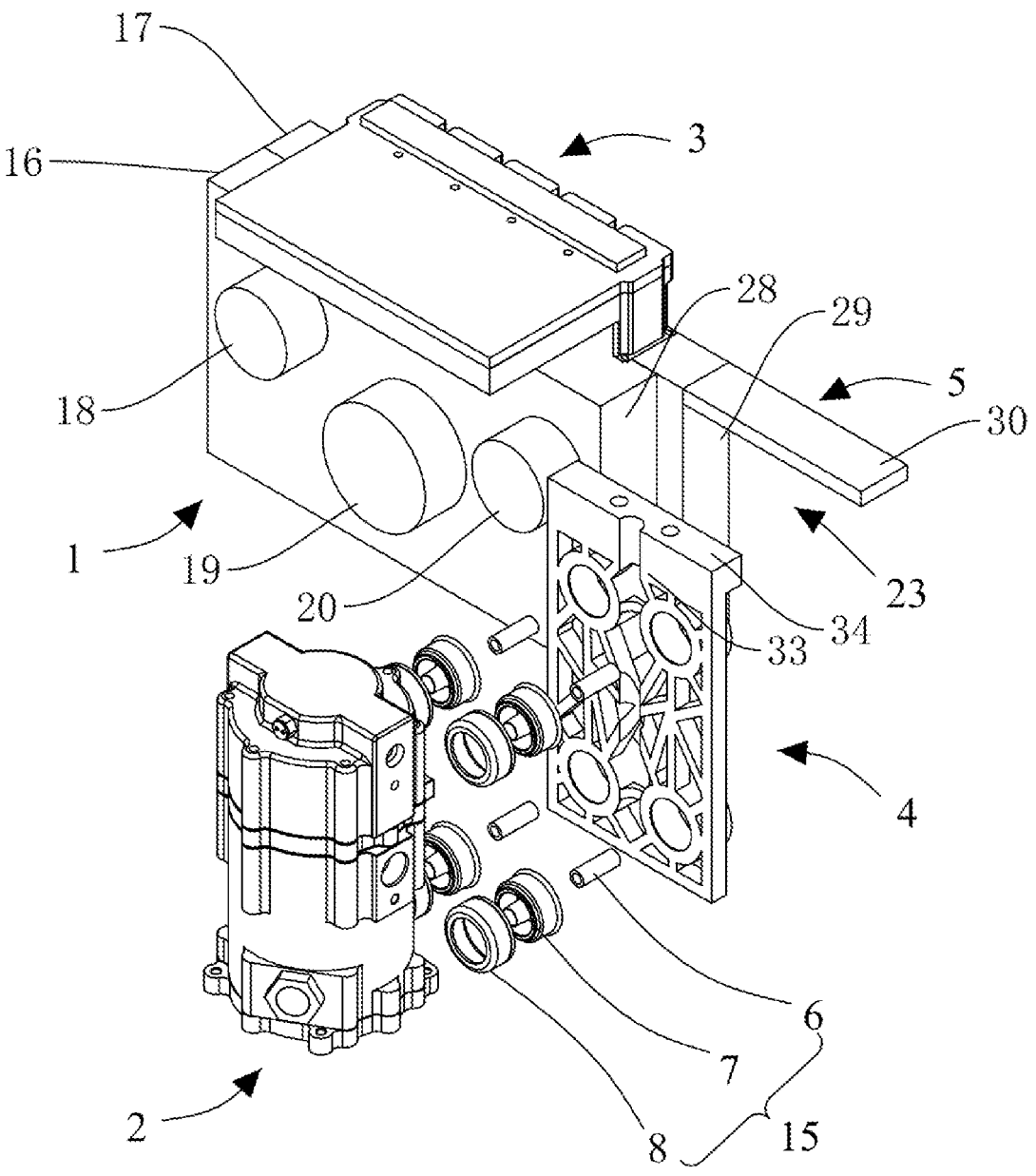
FIG. 5 is an exploded view of the thermal management integrated module shown in FIG. 1.
Figure 9:
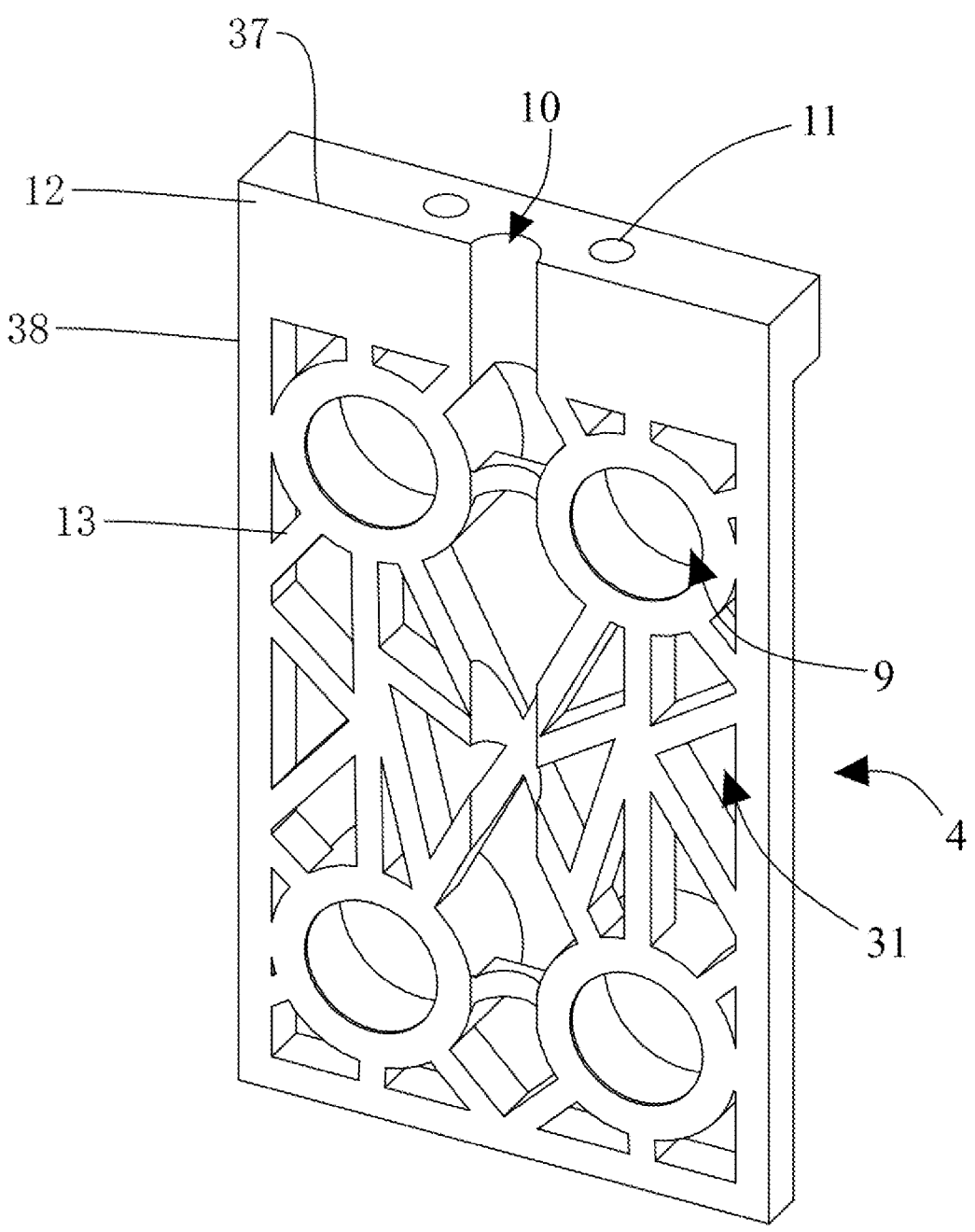
FIG. 9 is a perspective view of the compressor bracket shown in FIG. 6.

Further, as shown in FIG. 2, FIG. 5 and FIG. 9, in the present disclosure, the compressor bracket 4 includes a corner portion 12 adapted to the corner mounting area 23. A transverse side 37 of the corner portion 12 is connected to a transverse frame. The specific connection method can be brazing, bonding, fastening, matching, interlocking, installation, and forming. The present disclosure adopts a bolt connection method for fixing. That is, the transverse portion 36 is provided with a plurality of internal thread holes 32, and the transverse side 37 of the corner portion 12 is provided with a plurality of through holes 11 corresponding to the internal thread holes 32 in a one-to-one correspondence manner. The operator can insert the bolts from the through holes 11 and screw them into the internal thread holes 32 so as to achieve fixed mounting of the compressor bracket 4 and the connecting portion 5. A surface of the transverse side 37 opposite to the connecting portion 5 is the second mounting portion 34. The longitudinal side 38 of the corner portion 12 is at least partially connected or embedded with the first side wall 29 or there is a certain avoidance gap between the longitudinal side 38 of the corner portion 12 and the first side wall 29. It is understandable that the longitudinal side 38 of the corner portion 12 and the first side wall 29 can be arranged in various ways. In a possible embodiment, the longitudinal side 38 of the corner portion 12 is connected and fixed to the first side wall 29. The advantage of this solution is that the compressor bracket 4 is completely connected and fixed with the flow channel plate, so that the connection between the compressor bracket 4 and the flow channel plate has the highest strength. In another possible embodiment, the first side wall 29 defines a recessed groove along its length. The longitudinal side 38 of the corner portion 12 extends toward the recessed groove and has a limiting rib adapted to the recessed groove. When the compressor bracket 4 is mated with the connecting portion 5, the limiting rib can be embedded into the recessed groove first, and then the compressor bracket 4 can be pushed up along the longitudinal direction of the recessed groove, and then the compressor bracket 4 and the connecting portion 5 can be connected and fixed. The advantage of this solution is that the position of the compressor bracket 4 is first limited to facilitate subsequent connection and fixation, and it also has the effect of the previous solution. In yet another possible embodiment, at least part of the longitudinal side 38 of the corner portion 12 has no direct connection relationship with the side wall of the flow channel portion. Instead, there is a certain distance of the avoidance gap between the two, or the longitudinal side 38 of the corner portion 12 is in close contact with the side wall of the flow channel portion. Although this solution does not have the connection strength as strong as the above two solutions, the advantage of this solution is that it can effectively achieve a partial vibration reduction effect. The vibration of the compressor 2 will inevitably cause the compressor bracket 4 to shake. The shaking of the compressor bracket 4 will indirectly affect the shaking of the flow channel plate through the connecting portion 5. With the first two solutions, the contact surface 39 between the compressor bracket 4 and the flow channel plate increases, which increases the shaking of the flow channel plate.

As shown in FIG. 1, in the illustrated embodiment, the compressor bracket 4 and the compressor 2 are located on a same side of the flow channel plate. The second flow channel plate 16 includes a first wall 28 facing the compressor 2. The length direction of the compressor 2 is parallel to the first wall surface 28. If the compressor 2 is disposed on a side portion of the refrigerant flow channel plate, the compressor 2 will not affect the port position/number settings of different components of the refrigerant flow channel plate. Moreover, the shape of the refrigerant flow channel plate, the flow channel layout and the refrigerant circuit, etc., can be flexibly designed. The compressor 2 is disposed longitudinally (along the Y direction), and the compressor 2 and the compressor bracket 4 are mounted relatively parallel, which can effectively reduce the volume of the entire thermal management integrated module, and make it more compact.

Figure 10:
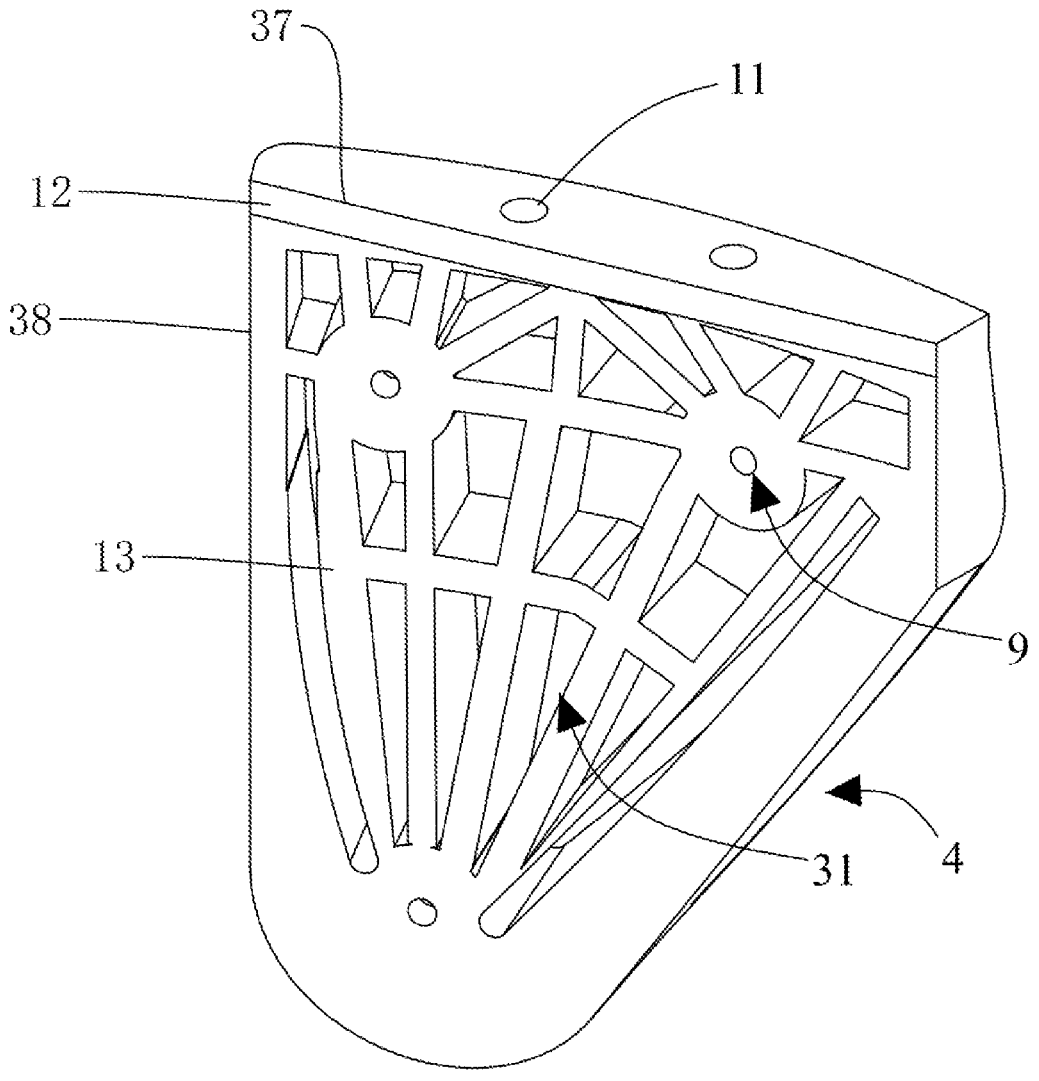
FIG. 10 is a perspective view of the compressor bracket in accordance with another embodiment of the present disclosure.

As shown in FIG. 9, in the illustrated embodiment, the compressor bracket 4 includes a hollow portion 31. In an optional embodiment, the compressor bracket 4 may be a single panel. However, the preferred solution is still a hollow structure. The compressor 2 itself has a certain weight, and if the compressor bracket 4 is still made of the single panel, it will be too heavy. Therefore, the hollow design can effectively reduce the weight of the entire thermal management integrated module. In addition, the compressor bracket 4 is hollowed out to form a plurality of reinforcing blocks 13 that cross vertically and horizontally. The arrangement of the reinforcing blocks 13 enables the compressor bracket 4 to maintain high support strength even after the hollowing process. As shown in FIG. 9 and FIG. 10, the compressor bracket 4 has two structures, namely a rectangular structure or an irregular shape structure. The first mounting portion 33 and the second mounting portion 34 are connected and perpendicular to each other. The first mounting portion 33 includes a contact surface 39 that is at least partially in contact with the compressor 2. The contact surface 39 is a flat surface or an inner concave surface. If the contact surface 39 adopts the flat surface, the flat surface will be tangent to a casing of the compressor 2. If the contact surface 39 adopts the inner concave surface, the inner concave surface is adapted to an arc of the casing of the compressor 2. The contact area 39 between the inner concave surface and the casing of the compressor 2 is larger, and the mounting fit is higher compared to the flat surface. Therefore, the stability and strength of the compressor 2 and the compressor bracket 4 are also higher.

Figure 6:
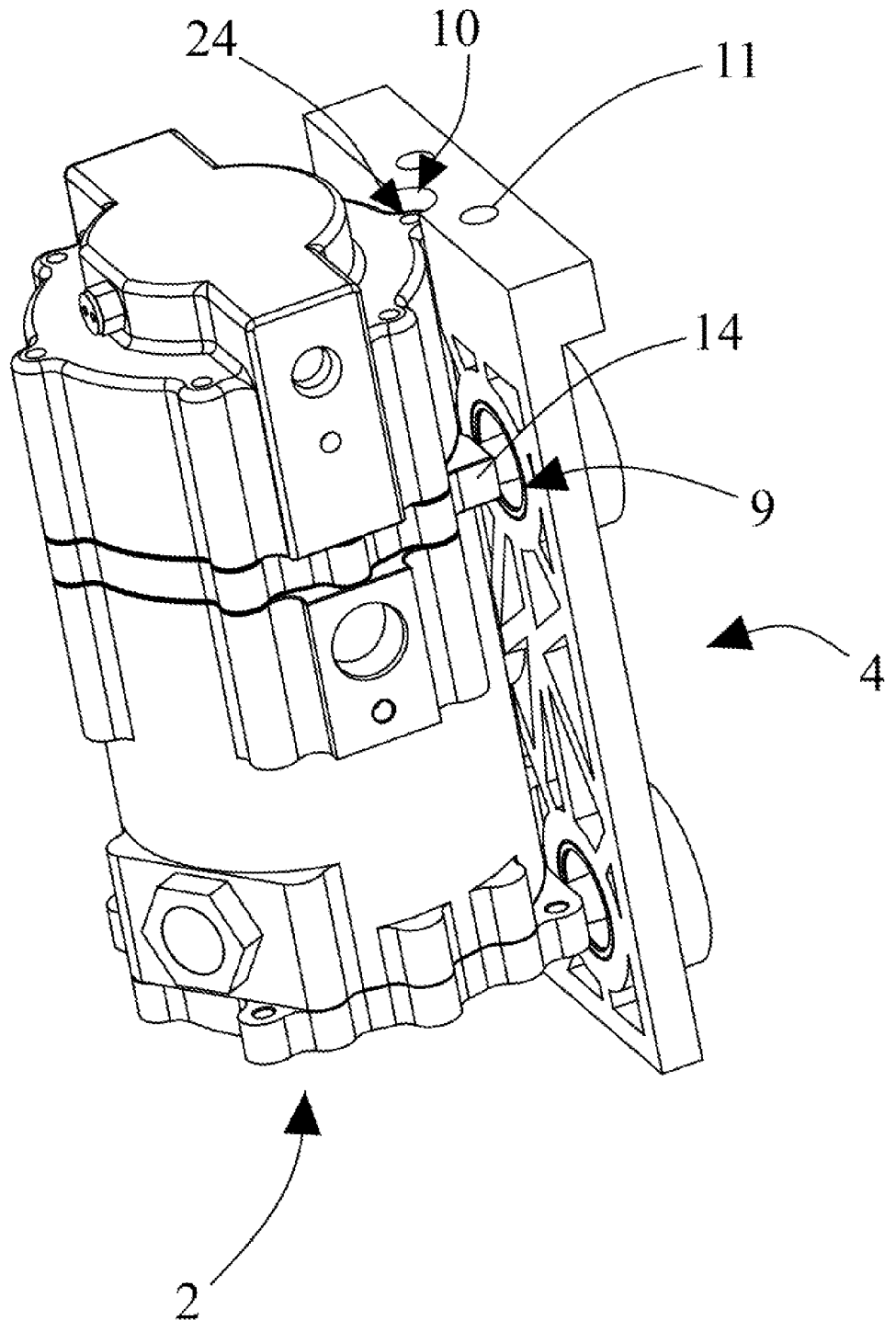
FIG. 6 is a perspective view of a compressor and a compressor bracket shown in FIG. 1.

As shown in FIG. 6 and FIG. 9, in the embodiment of the present disclosure, the casing of the compressor 2 includes at least one ridge 24. The compressor bracket 4 includes at least one groove 10 matching the ridge 24. When the compressor 2 is mated with the compressor bracket 4, the ridge 24 is embedded into the groove 10 to limit and lock. This structure can make the compressor 2 and the compressor bracket 4 fit more closely and be mounted more closely.

Figure 7:
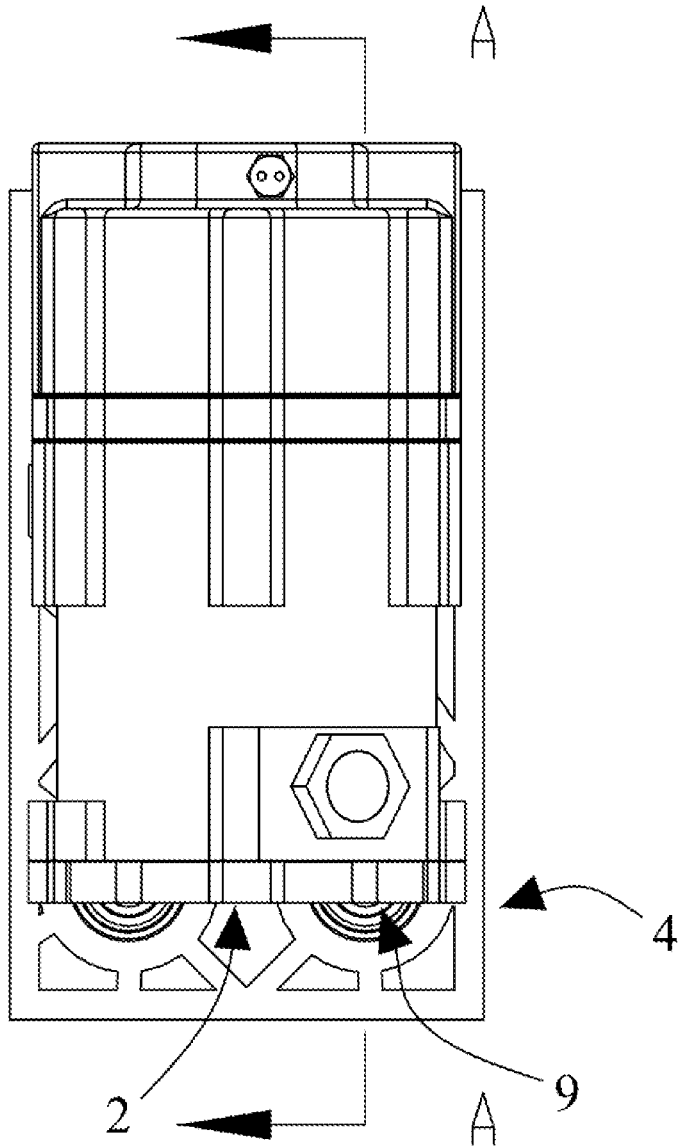
FIG. 7 is a top view of the compressor and the compressor bracket shown in FIG. 6.
Figure 8:
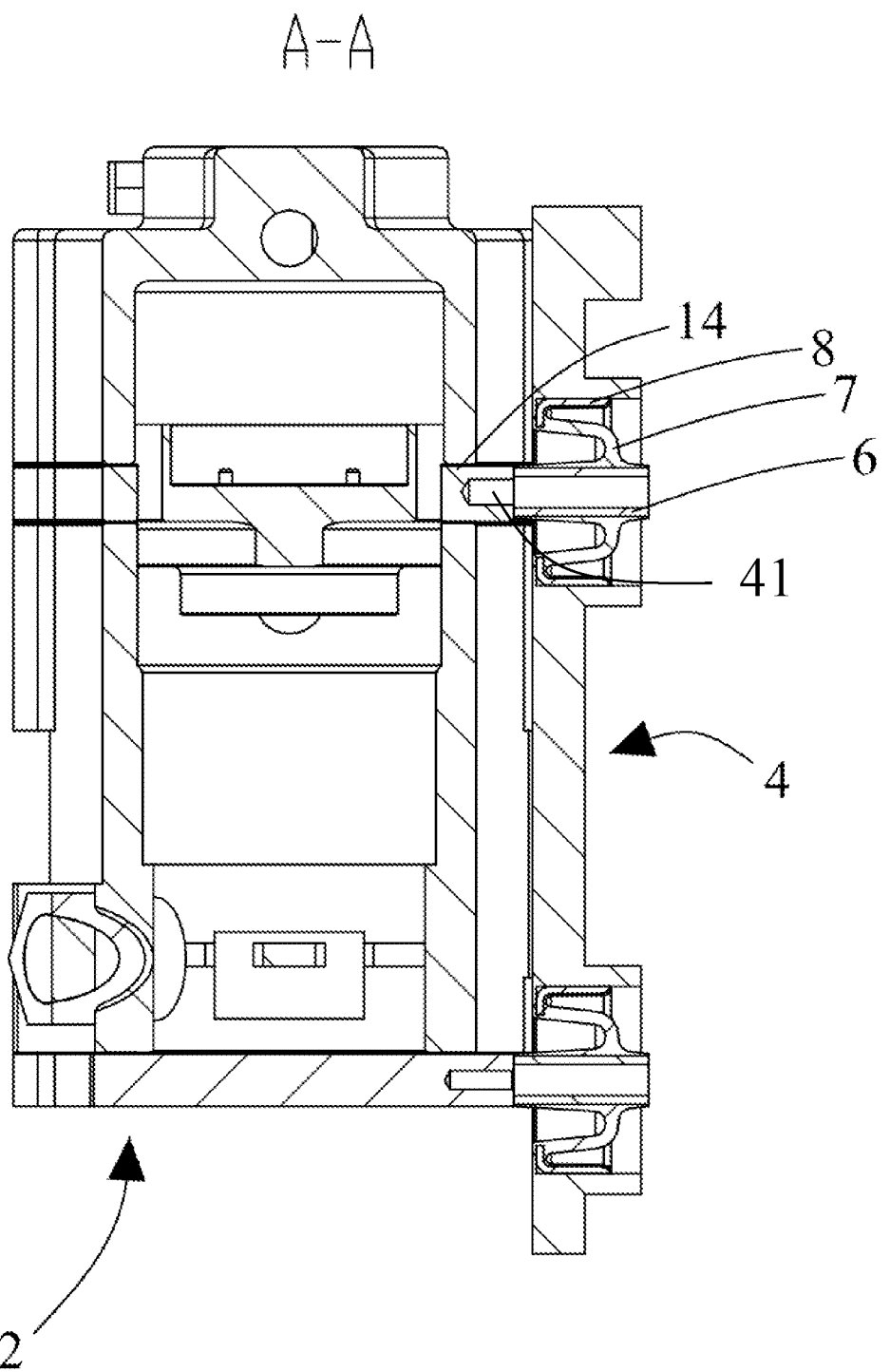
FIG. 8 is a cross-sectional view of the compressor and the compressor bracket taken along direction A-A in FIG. 7.

Considering that if there is a purely rigid connection between compressor 2 and compressor bracket 4, the vibration of compressor 2 will be directly transmitted to the integrated module, which will reduce the reliability of the integrated module and lead to the risk of fatigue fracture. Therefore, as shown in FIG. 5, FIG. 7 and FIG. 8, in the illustrated embodiment, the thermal management integrated module includes a vibration reduction assembly 15. The compressor 2 is fixedly connected to the vibration reduction assembly 15. The vibration reduction assembly 15 is fixedly connected to the compressor bracket 4. The function of the vibration reduction assembly 15 is to effectively reduce the vibration of the compressor 2 from being transmitted to the first flow channel plate 17 and improve the service life of the thermal management integrated module. The vibration reduction assembly 15 can be implemented in various ways, such as a vibration reduction rubber ring, a silicone buffer pad, etc. It may be enough to use some flexible material placed between the compressor bracket 4 and the compressor 2, but the effect may not be the best. In the present disclosure, the compressor bracket 4 defines a plurality of through holes 9. A diameter of the through hole 9 is adapted to the vibration reduction assembly 15. The vibration reduction assembly 15 is at least partially embedded in the through holes 9. The number of through holes 9 is specifically set according to actual needs. The above-mentioned adaptation of the diameter of the through hole 9 to the vibration reduction assembly 15 includes interference fit, clearance fit, transition fit, etc. In FIG. 9 and FIG. 10, the number of through holes 9 may be four or three. If implemented as a solution with four through holes 9, the four through holes 9 will be evenly distributed at four ends of the compressor bracket 4. If implemented as a solution with three through holes 9, the points of the three through holes 9 are connected to form a triangular relationship. The connection between the through holes 9 forming the triangular relationship and the compressor 2 can enhance the connection strength and stability between the compressor 2 and the compressor bracket 4.

Figure 11:
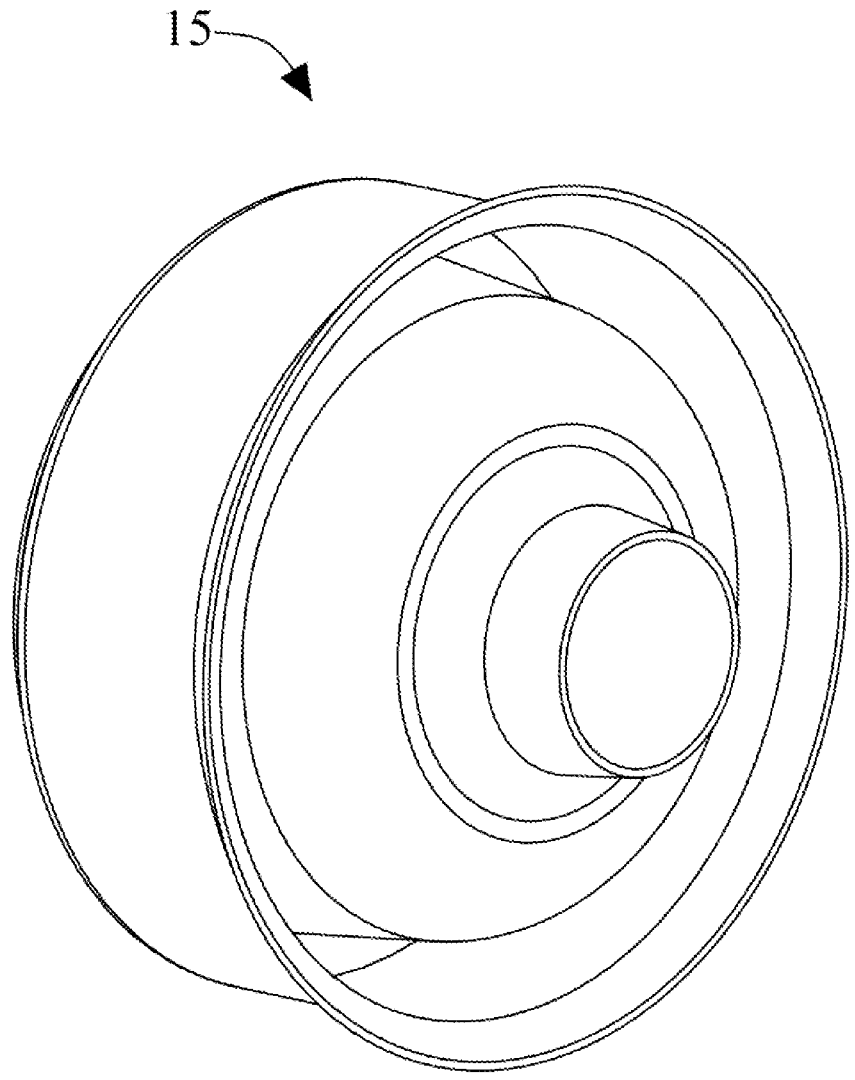
FIG. 11 is a perspective view of a vibration reduction assembly shown in FIG. 5.
Figure 12:
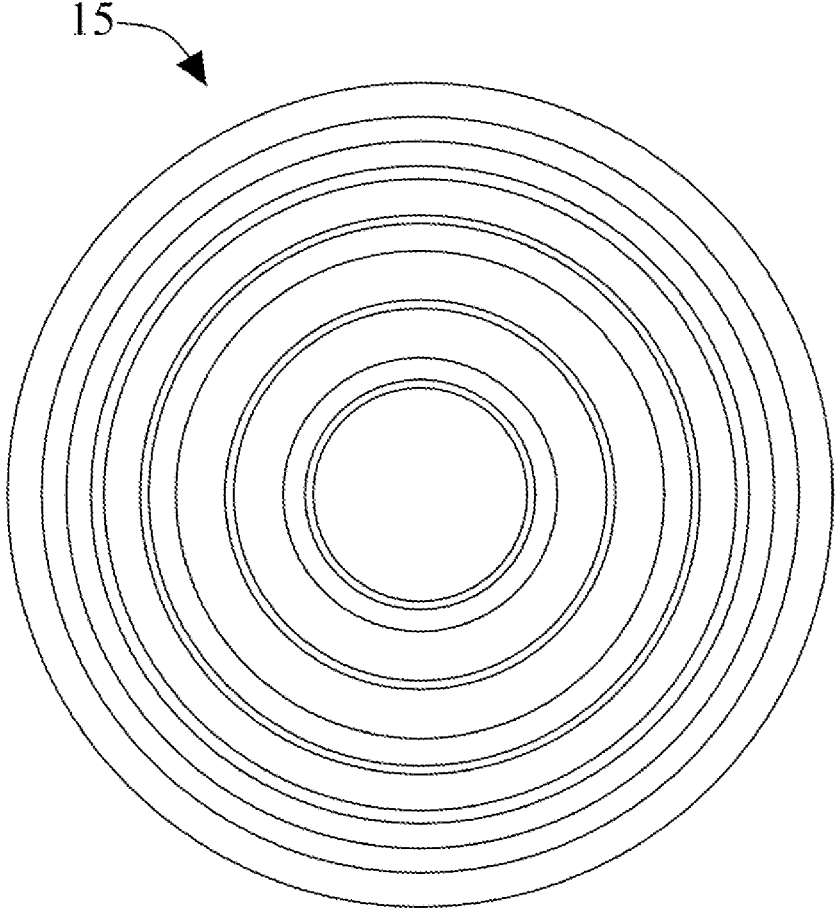
FIG. 12 is a front view of the vibration reduction assembly shown in FIG. 11.

As shown in FIG. 11 and FIG. 8, in the embodiment of the present disclosure, the vibration reduction assembly 15 includes an outer ring 8, a vibration reduction seat 7 and an inner ring 6. A diameter of the outer ring 8 is larger than a diameter of the inner ring 6. The vibration reduction seat 7 is at least partly made of flexible material, such as rubber. At least part of the outer ring 8 and the inner ring 6 are made of rigid materials, such as aluminum alloy among metal materials, PP among plastic materials, etc. The outer ring 8 is fixedly sleeved on an outside of the vibration reduction seat 7. The inner ring 6 is fixedly inserted into an inside of the vibration reduction seat 7. An outer wall surface of the outer ring 8 is fixed to an inner hole wall of the through hole 9. The compressor 2 includes a protruding block 14 corresponding to the through holes 9. The protruding block 14 defines a plurality of matching holes 41. The compressor bracket 4 includes a plurality of bolts. The bolt passes through the inner ring 6 and is at least partially located in a corresponding matching hole 41. The advantage of choosing the structure of the vibration reduction assembly 15 in this way is that the vibration reduction seat 7 of the rubber portion is clamped between the outer ring 8 and the inner ring 6, which has a certain limiting effect. That is, the vibration reduction seat 7 of the rubber portion deforms within a limited area to prevent the rubber portion from deforming too much. In addition, the inner ring 6 is used for the bolts to pass through, and the rigid material can prevent the bolts from being squeezed and prevent the bolts from loosening with the compressor 2. If the inner ring 6 is made of rubber, the inner ring 6 will vibrate and deform during the vibration of the compressor 2. Once the inner ring 6 is deformed, the connection effect between the bolt and the compressor 2 will be affected. The outer ring 8 is also made of rigid material to consider the connection with the compressor bracket 4. The outer ring 8, the vibration reduction seat 7 and the inner ring 6 can be manufactured using a rubber injection vulcanization process. First, the outer ring 8 and the inner ring 6 are placed in designated positions of a mold; and then a space between the outer ring 8 and the inner ring 6 is filled with rubber through an injection vulcanizer, and the required shape of the vibration reduction seat 7 can be formed according to the actual situation.

It is understandable to those skilled in the art that the embodiments of the present disclosure shown in the above description and drawings are only examples and do not limit the present disclosure.

The objects of the present disclosure have been fully and effectively achieved. The functional and structural principles of the present disclosure have been shown and described in the embodiments, without departing from the principles, the embodiments of the present disclosure may have any variations or modifications.

What is claimed is:

1. A thermal management integrated module, comprising:
a compressor;
a first flow channel plate; the first flow channel plate comprising a body portion and a connecting portion; the body portion defining at least one flow channel; the body portion and the connecting portion being of a one-piece configuration; and
a compressor bracket; the compressor bracket comprising a first mounting portion and a second mounting portion; the first mounting portion and the second mounting portion having different orientations; the compressor being connected to the first mounting portion; and the connecting portion being connected to the second mounting portion;
wherein the thermal management integrated module comprises a second flow channel plate;

wherein the thermal management integrated module further comprises a battery cooling water pump, a multi-way valve, a motor cooling water pump, an integrated controller and a battery cooler; and
wherein the first flow channel plate comprises a plurality of first valve ports for mounting refrigerant throttling valves and a plurality of second valve ports for mounting refrigerant switching valves; the first valve ports and the second valve ports are disposed along a length direction of the body portion; the integrated controller is provided on the first flow channel plate; the battery cooling water pump is mounted to the first flow channel plate; the battery cooling water pump, the motor cooling water pump and a multi-way water valve are all mounted to the second flow channel plate; the battery cooling water pump, the motor cooling water pump, the multi-way water valve, the refrigerant throttling valves, the refrigerant switching valves and the battery cooler are all electrically connected to the integrated controller.

2. The thermal management integrated module according to claim 1, wherein the connecting portion comprises a transverse portion extending along a length direction of the body portion; the body portion comprises a first side wall facing the compressor bracket; the transverse portion and the first side wall form a corner mounting area in which the compressor bracket is at least partially located;
the compressor bracket comprises a corner portion; a transverse side of the corner portion is connected to the transverse portion; a longitudinal side of the corner portion is at least partially connected or embedded with the first side wall or has an avoidance gap with the first side wall.

3. The thermal management integrated module according to claim 2, wherein the transverse portion defines a plurality of internal thread holes; the transverse side of the corner portion defines a plurality of through holes corresponding to the plurality of internal thread holes in a one-to-one correspondence manner.

4. The thermal management integrated module according to claim 2, wherein the longitudinal side of the corner portion is connected and fixed to the first side wall.

5. The thermal management integrated module according to claim 1, wherein the second flow channel plate comprises a first wall facing the compressor; a length direction of the compressor is parallel to the first wall.

6. The thermal management integrated module according to claim 1, wherein the compressor bracket comprises a hollow portion;
wherein the first mounting portion and the second mounting portion are connected; the first mounting portion and the second mounting portion are perpendicular to each other; the first mounting portion comprises a contact surface that is at least partially in contact with the compressor; the contact surface is a flat surface or an inner concave surface; the flat surface is tangent to a casing of the compressor; the inner concave surface is adapted to an arc of the casing of the compressor.

7. The thermal management integrated module according to claim 1, wherein the compressor comprises at least one ridge; the compressor bracket comprises at least one groove matching the ridge.

8. The thermal management integrated module according to claim 1, further comprising a vibration reductor; the compressor is fixedly connected to the vibration reductor; the vibration reductor is fixedly connected to the compressor bracket.

9. The thermal management integrated module according to claim 8, wherein the compressor bracket defines a plurality of through holes adapted to the vibration reductor; the vibration reductor is at least partially embedded in the through holes.

10. The thermal management integrated module according to claim 9, wherein the vibration reductor comprises an outer ring, a vibration reduction seat and an inner ring; a diameter of the outer ring is larger than a diameter of the inner ring; the vibration reduction seat is at least partially made of flexible material; the outer ring and the inner ring are at least partially made of rigid material; the outer ring is fixedly sleeved on an outside of the vibration reduction seat; the inner ring is fixedly inserted in an inside of the vibration reduction seat; an outer wall surface of the outer ring is connected with an inner hole wall of a corresponding through hole;

the compressor comprises a protruding block corresponding to the through holes; the protruding block defines a plurality of matching holes; the compressor bracket comprises a plurality of bolts; the bolts extend through the inner ring and at least partially located in corresponding matching holes.

11. The thermal management integrated module according to claim 9, wherein an adaption between the through holes and the vibration reductor comprises interference fit, clearance fit and transition fit.

12. The thermal management integrated module according to claim 5, wherein the first flow channel plate is a refrigerant flow channel plate; the second flow channel plate is a coolant flow channel plate; the first flow channel plate and the second flow channel plate are disposed in an overlapping manner, and are connected and fixed; the first flow channel plate and the second flow channel plate are made of different materials, wherein the first flow channel plate is at least partially made of metal, and the second flow channel plate is at least partly made of plastic material;

the connecting portion comprises a first surface facing away from the compressor bracket; the first surface is flush with a top surface of the first flow channel plate;

the first flow channel plate and the connecting portion are respectively provided with a plurality of bosses; each boss defines a mounting hole matched with a bolt.

13. The thermal management integrated module according to claim 1, wherein the battery cooler is mounted to the first flow channel plate.

14. The thermal management integrated module according to claim 12, wherein the first surface of the connecting portion and a top surface of the first flow channel plate form a stepped structure.

15. The thermal management integrated module according to claim 12, wherein the bosses, the first flow channel plate and the connecting portion are of a one-piece configuration.

16. The thermal management integrated module according to claim 1, wherein the compressor is a centrifugal compressor or an axial flow compressor.

17. The thermal management integrated module according to claim 1, wherein the compressor bracket and the connecting portion are rigidly connected or floatingly connected.

18. The thermal management integrated module according to claim 1, wherein the compressor and the compressor bracket are rigidly connected or floatingly connected.

19. The thermal management integrated module according to claim 1, wherein the body portion and the connecting portion are of a one-piece configuration.

* * * * *